United States Patent
Connolly et al.

[11] Patent Number: 5,605,553
[45] Date of Patent: Feb. 25, 1997

[54] CERAMIC HOT-GAS FILTER

[75] Inventors: Elizabeth S. Connolly, Wilmington, Del.; George D. Forsythe, Landenberg, Pa.

[73] Assignee: Du Pont Lanxide Composites Inc., Newark, Del.

[21] Appl. No.: 475,286

[22] Filed: Jun. 7, 1995

Related U.S. Application Data

[63] Continuation-in-part of Ser. No. 221,139, Mar. 31, 1994, Pat. No. 5,460,637.

[51] Int. Cl.$^6$ .......................... B01D 39/20; C04B 41/50
[52] U.S. Cl. .......................... 55/487; 55/523; 55/527
[58] Field of Search ............... 55/523, 486, 487, 55/527, 529, 498

[56] References Cited

U.S. PATENT DOCUMENTS

| | | | |
|---|---|---|---|
| 3,843,561 | 10/1974 | Sobel | 252/465 |
| 3,949,109 | 4/1976 | McBride | 428/36 |
| 3,986,528 | 10/1976 | Green | 138/177 |
| 4,092,194 | 5/1978 | Green | 156/89 |
| 4,626,483 | 12/1986 | Stanton | 55/487 |
| 4,732,594 | 3/1988 | Mizrah et al. | 55/523 |
| 4,746,341 | 5/1988 | Komoda | 55/487 |
| 4,810,273 | 3/1989 | Komoda | 55/487 |
| 4,846,906 | 7/1989 | Helferich et al. | 156/89 |
| 4,889,630 | 12/1989 | Reinhardt et al. | 210/490 |
| 4,946,487 | 8/1990 | Butkus | 55/523 |
| 4,968,467 | 11/1990 | Zievers | 264/62 |
| 4,976,760 | 12/1990 | Helferich et al. | 55/487 |
| 5,071,457 | 12/1991 | Schmidt, Jr. et al. | 55/523 |
| 5,073,178 | 12/1991 | Mimori et al. | 55/523 |
| 5,079,064 | 1/1992 | Forsythe | 428/131 |
| 5,098,454 | 3/1992 | Carpenter et al. | 55/523 |
| 5,168,092 | 12/1992 | Forsythe | 502/439 |
| 5,192,597 | 3/1993 | Forsythe | 428/34.5 |
| 5,460,637 | 10/1995 | Connolly et al. | 55/487 |
| 5,500,029 | 3/1996 | Zievers et al. | 55/DIG. 5 |

FOREIGN PATENT DOCUMENTS 0216729  4/1987  European Pat. Off. .

*Primary Examiner*—Jay H. Woo
*Assistant Examiner*—Duane S. Smith
*Attorney, Agent, or Firm*—Kevin J. Boland

[57] ABSTRACT

A ceramic hot-gas candle filter having a porous support of filament-wound oxide ceramic yarn at least partially surrounded by a porous refractory oxide ceramic matrix, and a membrane layer on at least one surface thereof. The membrane layer may be on the outer surface, the inner surface, or both the outer and inner surface of the porous support. The membrane layer is formed of an ordered arrangement of continuous filament oxide ceramic yarn which is at least partially surrounded by a porous refractory oxide ceramic matrix. The filter can withstand thermal cycling during backpulse cleaning and is resistant to chemical degradation at high temperatures.

23 Claims, 2 Drawing Sheets

CERAMIC HOT-GAS FILTER

CROSS REFERENCE TO RELATED APPLICATIONS

This application is a continuation-in-part of U.S. patent application Ser. No. 08/221,139, filed on Mar. 31, 1994, in the names of Connolly, et. al, and entitled "Ceramic Hot-Gas Filter and Process Therefor", now U.S. Pat. No. 5,460,637, which issued on Oct. 24, 1995 and is entitled "Ceramic Hot-Gas Filter".

FIELD OF THE INVENTION

The present invention relates to a composite ceramic candle filter for removing particulates from a hot gas stream, and a method for making said filter.

DESCRIPTION OF RELATED ART

Ceramic filters have been tested in processes such as coal gasification and coal combustion to remove particulates from hot flue gases to protect downstream equipment from corrosion and erosion and to comply with EPA NSPS (New Source Performance Standards) regulations. Ceramic filters in a tubular (candle) form, with one end closed and the other end open have been shown to remove the particulates efficiently. The hot gas to be filtered typically flows from the outside to the inside of the filter, with particulate-free gas exiting from the open end. The candle geometry is also suited for removal of the filtered cake by backpulsing with compressed gases.

Ceramic hot-gas candle filters must withstand exposure to chemically corrosive gas streams at temperatures in excess of 800° C. In addition, they are subjected to significant thermal stresses during backpulse cleaning which can cause catastrophic failure of the ceramic candle filter element.

Ceramic hot-gas candle filters known in the art are generally fabricated from either porous monolithic materials or porous ceramic fiber-containing composite materials. Monolithic ceramic candle filters are either weak or can fail catastrophically in use. Composite filters are less susceptible to catastrophic failure and generally have improved strength, toughness, and thermal shock resistance versus monolithic ceramic filters.

Candle filters may have relatively uniform porosity throughout the filter or they may comprise a porous support with a thin layer, or membrane, of fine porosity on the outer surface of the support. The membrane layer is typically applied to the filter using a variety of methods such as coating from a dispersion containing finer grains than those used in the support for smaller membrane pore sizes, bonding randomly arranged chopped ceramic fibers to the support using colloidal (or sol) materials, or forming a ceramic matrix by chemical vapor infiltration.

Materials used to fabricate ceramic hot-gas filters generally include oxides such as aluminosilicates, glass, and alumina, and non-oxides such as silicon carbide and silicon nitride. Oxide-based ceramic filters have adequate resistance to flue gas atmospheres and fly-ash for the design life of the filters however they generally have low thermal shock resistance. Non-oxide ceramics generally have good thermal shock resistance, however they are susceptible to oxidation in the corrosive environment to which they are subjected which results in a degradation of mechanical properties.

The disadvantages of ceramic candle filters known in the art include failure, often catastrophic, due to thermally induced stresses caused by backpulse cleaning, chemical degradation caused by species present in the hot gases being filtered, delamination of the membrane layer, incomplete removal of the filter cake upon backpulsing, and high cost. They also tend to be heavy, requiring expensive support structures to hold an array of the candles in the filter unit.

The present invention provides a strong, lightweight ceramic hot-gas candle filter which has a greater than 99.5% particulate collection efficiency, thus meeting EPA NSPS regulations. The filter of the present invention comprises a filament wound support having a membrane layer applied to at least one surface thereof. For example, the membrane layer may be applied to the outer surface thereof, the inner surface thereof, or to both the outer and inner surface of the filament wound support. The support comprises a reticulated tube of yarns comprising ceramic oxide fibers which are at least partially coated with a porous refractory oxide matrix. The membrane layer(s) comprises an ordered arrangement of continuous filament ceramic oxide yarns which are also coated with a porous refractory oxide matrix. The membrane layer(s) is firmly adherent to the support and therefore does not suffer from delamination problems. The porosities of the support and membrane are controlled such that the support functions as a bulk filter and the membrane layer functions as a surface filter. Failure of the filter is generally not catastrophic since if the membrane is damaged, the support quickly blinds at the location of the damage due to its bulk filtration properties, thus preventing release of particulates and protecting downstream process equipment such as gas turbines or sorbent beds. The filter of the present invention is resistant to chemical degradation due to the oxide compositions used, and at the same time provides excellent thermal shock resistance which is not generally typical of oxide materials. The smoothness of the membrane surface(s) results in efficient removal of the filter cake during backpulse cleaning. In addition to the above-mentioned advantages, the filter of the current invention is potentially low cost relative to most of the commercially available candle filters.

SUMMARY OF THE INVENTION

The present invention is directed to a ceramic hot gas filter comprising a porous elongated filter support and a porous membrane layer on at least one surface thereof. Specifically, the porous membrane may be on the outer surface, the inner surface, or both the outer and inner surface of the porous elongated filter support. The support has an opening at one end into a hollow interior, a closed end opposite the open end, and an external flange integral with the open end. The support is formed of a plurality of layers of oxide ceramic support yarn, each layer being arranged in a criss-crossing relationship with neighboring layers to form a plurality of quadrilateral-shaped openings. The yarn in the support is coated with a first oxide ceramic material which, upon heat treatment, forms a porous refractory oxide support matrix. The membrane layer(s) is formed of an ordered arrangement of continuous filament oxide ceramic membrane yarn. The yarn in the membrane is coated with a second oxide ceramic material which, upon heat treatment forms a porous refractory oxide membrane matrix. Preferably, the support yarn and the continuous filament membrane yarn each contain at least 20 weight percent alumina ($Al_2O_3$) and have softening points above about 750° C. The oxide ceramic coating materials are generally particulates of oxides or oxide compounds, or mixtures thereof and may also include oxide precursor materials. Methods for forming the membrane layer(s) include hoop winding, multiple yarn winding, and fabric wrapping. The membrane layer(s) has a porosity that is less than that of the support. Preferably the quadrilateral-shaped openings have dimensions of about 100 to about 500 microns after heat treatment so that the support functions as a bulk filter. The membrane layer(s) preferably has pore diameters of about 0.1 to 10 microns and functions as a surface filter. In a preferred embodiment of the invention, the support yarn has generally the same composition as the membrane yarn and the support matrix has generally the same composition as the membrane matrix.

The present invention also provides a method for making a ceramic hot gas filter involving the steps of fabricating an elongated porous filter support by coating a ceramic oxide support yarn with a first coating composition, winding the coated support yarn onto a mandrel to form a plurality of layers of the coated support yarn, each layer being arranged in a criss-crossing relationship with neighboring layers to form a plurality of quadrilateral-shaped openings. The mandrel is contoured to provide an integral external flange adjacent one end of the support. The resulting support has an open end adjacent the flange, an outside surface, and a second open end opposite the flanged end. A membrane layer is formed on the outside surface of the support by coating a continuous filament oxide ceramic membrane yarn with a third coating composition and applying the coated membrane yarn in an ordered arrangement on the outer surface of the support. A membrane layer may be formed on the inside surface of the support by coating a continuous filament oxide ceramic membrane yarn with a third coating composition and winding the coated membrane yarn in an ordered arrangement onto a mandrel. After applying the membrane layer onto the mandrel, the elongated porous filter support is then applied as described above. The second open end is closed using an oxide ceramic material. In a final step, the support and membrane layer(s) are heat treated to convert the first coating composition to a porous refractory oxide support matrix and to convert the second (and third) coating composition to a porous refractory oxide membrane matrix. The first, second and third coating compositions are preferably slurries of particulates of oxides or oxide compounds, or mixtures thereof and may also include oxide precursors.

DETAILED DESCRIPTION OF THE INVENTION

Figure 1A:
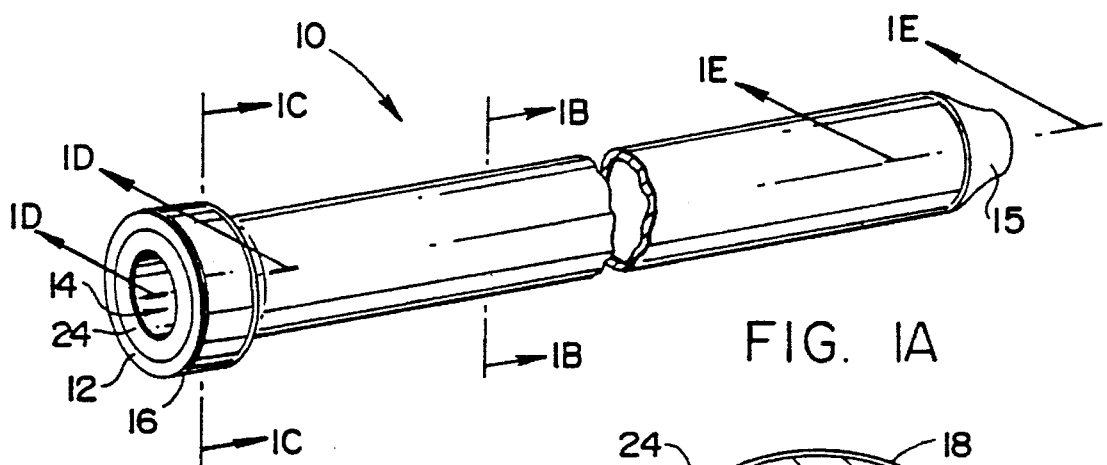
FIG. 1A is a schematic perspective view of an embodiment of a filter element of the current invention, including an optional flange collar section.
Figure 1B:
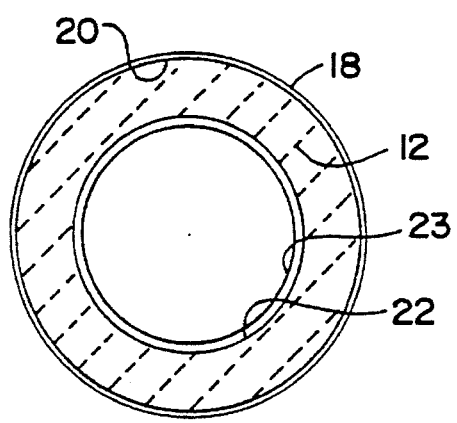
FIG. 1B is a cross section of the filter element taken on line 1B—1B of FIG. 1A.
Figure 1C:
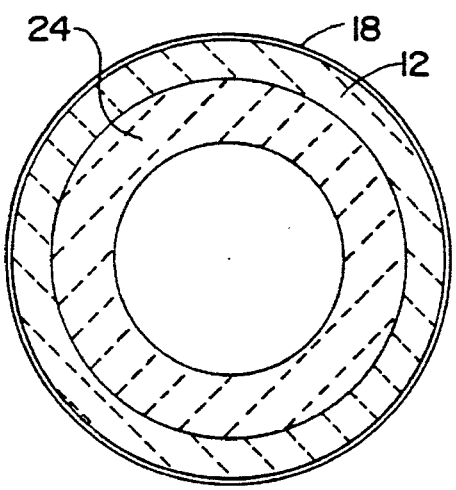
FIG. 1C is a cross section of the flange section taken on line 1C—1C of FIG. 1A.
Figure 1D:
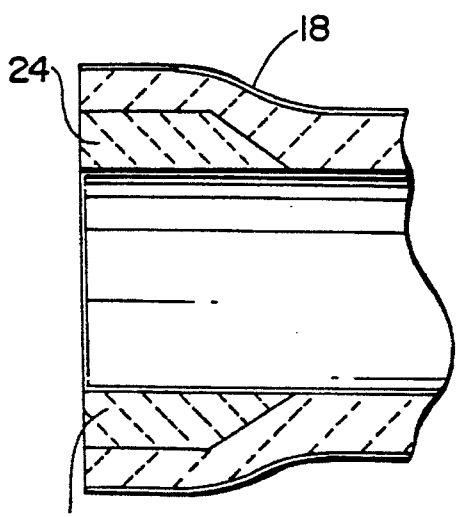
FIG. 1D is a cross section of the flange section taken on line 1D—1D of FIG. 1A.

The hot-gas filter of the current invention is of the candle filter type and comprises a porous ceramic support having a porous ceramic membrane layer on at least one surface thereof. Specifically, the porous membrane may be on the outer surface, the inner surface, or both the outer surface and inner surface of the porous ceramic support. The support has good filtration capacity for fly-ash and serves as a bulk filter, capable of trapping particulates between its inner and outer surface. The membrane(s) serve(s) as a surface filter, preventing particulates from penetrating therethrough.

By the term "ceramic" is meant crystalline or partially crystalline materials, or non-crystalline glasses, which comprise essentially inorganic, nonmetallic substances. Ceramics useful in the current invention are generally oxide ceramic materials and are essentially free of non-oxide ceramics so that the filter material is generally stable at high temperatures in corrosive environments. The term "oxide" is meant to include oxides, oxide compounds (e.g. mullite, spinel), or precursors thereof. The term "refractory" is meant to include ceramic materials having a melting point of at least 1000° C.

Referring to FIGS. 1A–1E, the filter 10 comprises a support 12 having a generally elongated tubular shape with an open end 14 at one end into a hollow interior. The end 15 of the support opposite the open end is generally closed. The support further includes an external flange 16 integral with the open end 14 which supports the filter in a tube sheet in use. The flange may also include an optional collar insert 24, integral with the flange, and described in more detail below. The membrane layer(s) 18, 23 are formed on the outer surface 20 of the support and/or the inner surface 22 of the support. End 15 is generally closed by filling with a ceramic material 26, and the flange section 16 and tip section of the support adjacent the closed end 15 made impervious as described below.

The porous support and membrane layers comprise ceramic oxide yarns which are at least partially surrounded by a porous refractory oxide matrix. The yarns are laid down in such a fashion as to obtain a membrane layer having a porosity which is less than the porosity of the support layer.

The overall porosity of the support layer is determined by a combination of the open volume created by the diamond or parallelogram-shaped openings (macropores) and the porosity of the support matrix (micropores). The porosity of the membrane layer is due to any defects (i.e. gaps between the coated membrane yarns) in the membrane layer as well as the porosity of the membrane matrix (micropores).

The macroporosity of the support may be calculated from the volume of the support (calculated from the measured dimensions of the support), the weight of the support, and the bulk density of the support (fiber and matrix, including any microporosity). The bulk density is measured using mercury porosimetry.

The matrix is applied in such a way that the channels in the support are not substantially closed. The matrix generally imparts integrity and mechanical strength to the support and also provides an excellent degree of thermal shock resistance because of the ability of the porous matrix to absorb thermally induced mechanical stresses which might otherwise fracture the fibers in the filter.

The support is formed of a plurality of layers of continuous ceramic oxide yarns which are laid down in spaced helical coils in a criss-crossing relationship with neighboring layers to form a plurality of diamond or quadrilateral-shaped openings having dimensions between 100 and 500 microns after firing. The openings form channels extending between the inner 22 and outer 20 surfaces of the support which follow tortuous, curved paths. If the filter is damaged, for example by damaging the membrane layer during installation, it will quickly "self-heal" by functioning as a bulk filter and blinding with particulates in the hot gas stream. A support containing a significant number of straight radial channels will not blind as readily, resulting in failure of the filter. Forsythe, U.S. Pat. 5,192,597, incorporated herein by reference, describes filament winding of reticulated ceramic tubes in a preferred winding pattern. The yarns in adjacent layers of diamond-like patterns are laid down in such a manner that the yarns forming the walls of the diamonds of each layer substantially cover the diamond shaped openings of each adjacent layer. This forms a tubular structure comprising series of interconnected diamond shaped openings, each layer of which interfere with the direct flow of gas from one layer to the next.

The winding pattern described above is for the elongated central body section of the support (i.e. the generally cylindrical section of the filter between the flange and closed end). Due to the contoured closed end and flange sections of the filter, the described winding pattern is not achieved at the flange and closed end.

Figure 2:
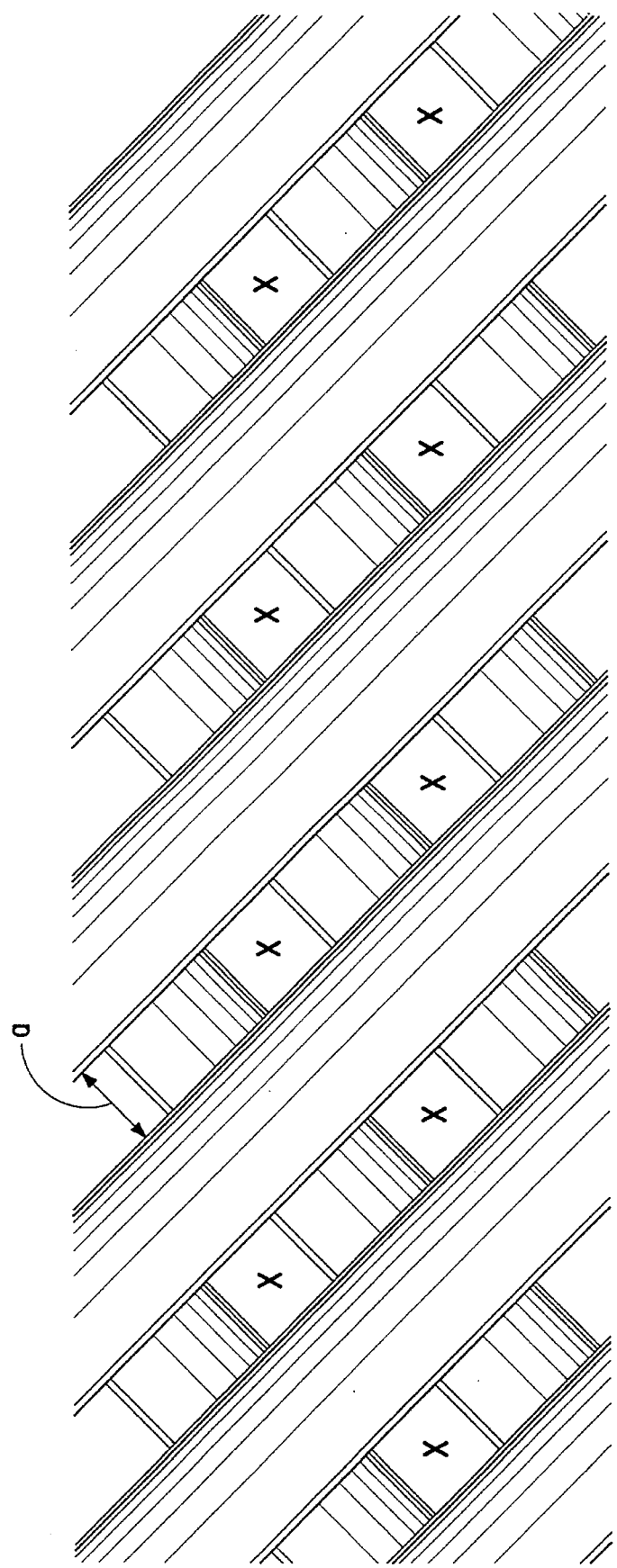
FIG. 2 shows openings formed by the overlap of two layers of yarn in a support layer comprising an embodiment of the present invention.

FIG. 2 shows two adjacent layers of yarn in a support prepared according to U.S. Pat. No. 5,192,597 (the matrix layer is not shown in this Figure) which define openings designated by "x". The size of the openings is controlled by the spacing between the yarns in each layer which is determined by the wind angle and yarn denier in addition to the amount of matrix material applied to the yarn. The spacing "a" between adjacent yarns is preferably controlled to provide openings having dimensions "a" of between about 100 and 500 microns in the final support, after high temperature firing. The openings have larger dimensions near the inner surface of the support, with the dimensions gradually decreasing in size, as winding continues, to the outer surface. The dimension "a" can be calculated based on the yarn spacing and the amount of matrix applied to the yarn. Alternately, "a" can be measured visually in the final support. A support having the described construction and having openings in this size range will function as a bulk filter which can trap particulates within the wall of the support while maintaining a pressure drop that is insignificant relative to the pressure drop across the membrane layer.

Figure 1E:
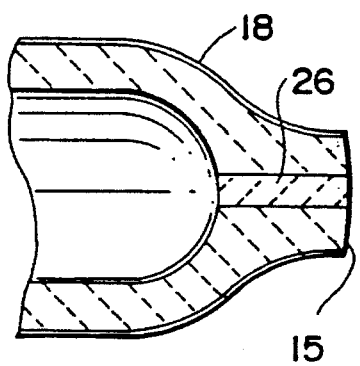
FIG. 1E is a cross section of the closed end taken on line 1E—1E of FIG. 1A.

The support may be formed by winding a ceramic oxide yarn on a suitably designed mandrel using a filament winder designed to maintain a constant winding ratio (rotational speed of the mandrel divided by the speed of the traverse arm). A constant winding ratio is necessary to maintain the proper size and distribution of channels throughout the wall. The flange section of the support is formed by using a mandrel that is wider at one end, the wide end being contoured to give the desired flange geometry. Filament winding on such a mandrel produces a tube with an external flange section at the open end and a small hole at the opposite end, which is generally closed in the final support, as shown in FIG. 1E, with a ceramic material 26. Alternately, if it is desired that the inside wall of the support be straight as opposed to contoured at the flange section, a filament wound collar insert 24, shown in FIG. 1C and FIG. 1D, having a composition similar to that of the support and having an inner diameter approximately equal to the outer diameter of the mandrel and an outer surface contoured to give the appropriate flange geometry may be used. The collar is inserted on the mandrel and the support is then wound on the combined mandrel and collar. When the support is removed from the mandrel, at least a portion of the collar remains with the support as part of the flange section, as illustrated in Example 2 below.

Field tests have demonstrated that hot-gas candle filters commonly fail at the flange section. According to the current invention, the flange and the body of the support are formed as a single unit to ensure homogeneity of the support material across the entire filter and to eliminate any stresses or weak spots arising from joining materials. The shape of the flange is not critical but should be reproducible. The flange should provide a good seal with the tubesheet that supports the filter in use so that no dust leakage occurs. The shape of the closed end is generally round, but various shapes are possible by suitably shaping the mandrel. The diameter of the opening at the closed end of the tube depends on the thickness of the shaft that supports the mandrel.

The membrane layer is applied to the outer surface of the support, the inner surface of the support, or to both the outer and inner surface of the support and comprises an ordered arrangement of continuous filament oxide ceramic yarns that are at least partially surrounded by a refractory oxide matrix. Preferably the membrane covers essentially all of the surface of the support to which it is applied, however it is not necessary for the membrane to be applied to the flange section of the support or to the end of the support which is later closed with a ceramic oxide cement or oxide slurry. The membrane layer(s) in the final filter, after heat treatment, has pore diameters of between about 0.1–10 microns, preferably 0.1–5 microns.

The ordered arrangement of yarns in the membrane layer(s) may be formed by various methods including circular (hoop) winding, multiple yarn winding, or wrapping with yarns pre-arranged in two or three dimensional forms such as fabric or braided materials. The membrane yarns should be arranged so as to obtain a smooth outer (or inner) membrane surface. A smooth membrane surface is desirable because it facilitates complete removal of the filtered material during backpulse cleaning because the filter cake readily debonds from the smooth surface. If the surface is rough, the filtered cake tends to be mechanically anchored to the surface making it difficult to completely remove the cake by backpulse cleaning. The smoothness of the membrane layer depends on the number of windings per unit length and the diameter of the sizing orifice, in addition to the yarn construction.

The yarns used to form the support and membrane layer(s) preferably comprise ceramic fibers having softening points of at least about 750° C., more preferably at least 1000° C. The phrase "softening point" is used herein to mean both the softening point of a glass ceramic and the melting point of a crystalline ceramic. The yarns used in the membrane layer(s) may be the same as or different than the yarns used in the support.

Suitable oxide fibers include certain glass fibers such as S glass (high tensile strength glass containing about 24–26% alumina($Al_2O_3$)), "Fiber Frax" alumina-silicate fiber, and polycrystalline refractory oxide fibers containing at least about 20% by weight of alumina such as the alumina-silica fibers disclosed in Blaze U.S. Pat. No. 3,503,765 and certain of the high alumina content fibers disclosed in Seufert and D'Ambrosio U.S. Pat. No. 3,808,015 and U.S. Pat. No. 3,853,688. Preferably the oxide fibers comprise between 20% and 80% by weight of aluminum oxide. Examples of commercially available aluminosilicate fibers include "Altex" (Sumitomo) and "Nextel" (3M) fibers. Fibers containing significant levels of glass-forming oxides such as $B_2O_3$ and $P_2O_5$ are not desirable because they will flux the entire structure resulting in a dense, nonporous support.

Fibers of refractory oxide precursors can also be used to form the support. After winding, the precursor fibers are converted to polycrystalline refractory oxide fibers by firing to remove volatiles, convert salts to oxides, and crystallize the fiber. The preparation of refractory oxide fibers and their precursors is disclosed in U.S. Pat. Nos. 3,808,015 and 3,853,688.

The oxide fibers generally have diameters in the range of 0.2 to 2.0 mils (0.005–0.05 mm) and are used in the form of continuous yarns, preferably containing 10–2,000 or more fibers. The fibers are preferably continuous filaments, however yarns of staple fibers can be used, especially glass. The yarns are preferably loosely twisted so that any loose or broken ends do not interfere during filament winding when the yarn is pulled through small orifices. The yarns may also be used in the form of roving. Bulked, interlaced, or textured yarns may be used. However, the yarns used in the membrane layer most preferably comprise continuous filament, untextured yarns so as to obtain a membrane layer having a smooth outer surface. Glass yarns which crystallize to form refractory oxides upon high-temperature heat treatment are preferred because they are easier to handle and less likely to break during filament winding than yarns containing crystalline ceramic fibers.

The refractory oxide matrix components of the support and membrane preferably have softening points above 1000° C., more preferably above about 1400° C., and most preferably above 2000° C. Preferably the matrix comprises at least 40 wt % alumina.

The matrix components are generally applied to the support and membrane layer(s) in the form of a coating composition which is then fired to form a refractory oxide matrix. The coating composition used in the support may be the same as or different than the coating composition used in the membrane. The coating composition generally comprises an aqueous solution, suspension, dispersion, slurry, emulsion, or the like which contains one or more oxide particulates or oxide precursors. Preferably the oxide particulates have a particle size of 1–20 microns, more preferably 1–10 microns, most preferably between 1–5 microns. Particle sizes less than 20 microns are preferred because they are readily dispersed and penetrate into voids between fibers. Slurries prepared using particle sizes less than 1 micron are generally too viscous at useful solid concentrations. Oxide particulates useful as matrix materials include alumina, zirconia, magnesia, mullite, spinel. Suitable matrix precursors include water soluble salts of aluminum, magnesium, zirconium and calcium such as "Chlorhydrol" (aluminum chlorohydrate solution sold by Reheis Chemical Co.), zirconyl acetate, alumina hydrate, basic aluminum chloracetate, aluminum chloride, and magnesium acetate.

Preferably, drying control additives such as glycerol and formamide are added to the coating composition at levels of 1–5 wt % based on the total weight of the coating composition. The drying control additives reduce drying stresses in the green body and also eliminate macroscopic cracks on the surface of the high-temperature fired filter.

The coating composition preferably includes a ceramic oxide binder to increase the green strength of the wound structure. The soluble oxide precursors which are useful as matrix precursors also function as binders. A preferred binder is fumed alumina, which contains alumina particles having particle sizes of about 10–50 nm. Preferably the coating composition includes between about 10–25 wt % of fumed alumina, calculated based on the total solids content of the coating composition. The fumed alumina serves to bond the larger oxide particulates together and increases the green strength of the support. The binders are incorporated into the refractory matrix upon heat treatment.

The coating composition may be applied to the support by drawing the ceramic oxide yarn through the coating composition prior to winding on a mandrel. Preferably, the coating composition is uniformly distributed around the fibers of the yarn. The distribution is affected by the viscosity of the coating composition, the method of application, the density (or tightness) of the yarn bundle, the nature of the yarn and the amount of the coating composition. The composition should have a viscosity that is low enough to permit flow and some penetration into voids in the yarn but high enough to adhere to the yarn bundle. When the coating composition is a particulate slurry, the solids content is preferably between 50–75 wt % and the slurry preferably has a viscosity in the range of 100–300 centipoise. If a coating composition containing both an oxide precursor and particulate oxide powder is used, the solids content of the slurry should be adjusted to about 60–90 wt % of the refractory oxide matrix material derived from the oxide particulate and about 10–40 wt % derived from the precursor. It is difficult to obtain sufficient amounts of oxide-containing materials in the coating composition using levels of precursor greater than about 40 wt %. The amount of matrix material applied to the yarn can be controlled by pulling the yarn through a suitably sized die to remove excess slurry. Moreover, during winding of the support and membrane layer(s) it is important to maintain a humidity level of at least about 30%. The coating composition may be also be applied to the yarn by use of a finish roll, spraying, etc.

Alternately, the matrix coating composition may be applied to the wound support by dipping the support in a slurry, draining off the excess and drying. Additional dipping steps may be used if necessary to provide the desired weight of matrix relative to the weight of yarn in the support. In general, it is difficult to apply the matrix coating composition by dipping without closing a significant portion of the channels in the support, which is not desirable and results in increased backpressure.

The membrane matrix coating composition may be applied to the membrane layer using methods similar to those described for the support. Preferably the combined weight of the matrix components of the support and membrane layers comprises about 40–70% of the final weight of the filter, more preferably about 50–60%. To avoid thermal stresses, it is preferable that the support yarn has generally the same composition as the membrane yarn and the support matrix has generally the same composition as the membrane matrix. For the same reason, it is preferable to have a weight ratio of fiber to matrix which is essentially the same in the membrane and the support.

In a preferred embodiment, the membrane is formed by hoop winding. The oxide ceramic membrane yarn is coated with the membrane matrix coating composition, for example by passing through a bath containing a coating composition, followed by passing through a sizing orifice to remove excess slurry, and winding tightly at approximately 90 degrees to the axis of the mandrel. Preferably, the diameter of the sizing orifice is carefully selected to give a matrix pick-up that yields similar weight ratios of fiber and matrix in the membrane and support layers. The rate of mandrel rotation relative to the rate of the movement of the transverse arm is controlled so that the yarns are laid down adjacent each other as close as possible with substantially no overlapping of yarns or gaps between yarns in the membrane layer. A proper selection of the number of windings per unit length will give a continuous and smooth membrane surface.

Alternately, multiple yarns are combined and wound on the support at substantially the same wind angle as that of the support to fill the underlying (or the eventual overlaying) openings in the support. This may be accomplished by feeding the separate yarns through tensioning devices, dipping in a ceramic matrix particulate slurry, and combining the yarns just prior to pulling through a larger sizing orifice than that used for single yarn ends and winding on the support if an outer surface membrane is desired, and on the mandrel if an inner surface membrane is desired. The diameter of the sizing orifice is selected as described above for hoop winding.

A membrane comprising a single filament wound layer on the support or on the inner surface of the support is generally adequate for many filtration applications. Additional layers of wound yarns may be applied to increase the thickness of the membrane layer. This usually increases the particulate collection efficiency and the back pressure of the filters.

In a third embodiment, the membrane layer is formed by wrapping the support or mandrel with a ceramic fabric. The fabric is wrapped on the filter support or mandrel and a matrix slurry similar in composition to that used in the support is brushed on the fabric. The slurry wets the fabric and the support, and provides bonding to the support. Any wrinkles in the fabric are removed while still wet. Additional layers of fabric are wrapped on the support or mandrel as necessary to increase the filtration efficiency. The fabrics useful for building the membrane layer include tightly woven plain and satin weaves. It may be necessary to use a matrix slurry containing matrix particulates having a smaller particle size than the matrix particulates used to wind the support in order to improve the adhesion between the filter support and fabric membrane layer. This is because the smaller particles will more readily infiltrate the interstices in the woven fabric. In general, this method is less preferred because it is more difficult to control the amount of matrix applied to the membrane layer. In addition, it has been found that the fabric layers tend to be less strongly adhered to the support than membranes formed using the filament winding techniques described above.

The flange section and the closed end may be reinforced and made impervious to any gas streams by saturating with a ceramic slurry or using a ceramic cement composition. To avoid reactions with the underlying support material and to match the thermal expansion of the support, the matrix material used in the support is preferred for this purpose. Closing of the bottom may be accomplished using commercial high temperature cements or by filling with a wad of the ceramic yarn used to form the support, dipping in a ceramic matrix particulate slurry, and firing. The cement may have a higher solid content than the matrix coating composition and may contain dispersed ceramic fibers for higher strength. The solids in the cement should not react with the tube material, which would reduce the thermal stability of the filter. Prior to application of the slurry or cement composition, the structure should be fired at temperatures between about 700° C. and 1400° C. in order to stabilize the structure so that it does not deform when contacted with the slurry, cement, or other materials in later processing steps. If this initial firing is carried out at temperatures less than about 1200° C., the structure will require a high temperature firing step at 1200 to 1400° C. to form stable crystalline phases and to stabilize the added material after application of the slurry or cement. If the initial firing is carried out at 1200 to 1400° C., an additional low-temperature firing at between about 700° C. and 1000° C. is necessary after application of the slurry or cement to stabilize the added material.

The green candle filter is generally dried at room temperature until it is strong enough to handle. It may then be fired at temperatures below the softening point of the ceramic yarn and sufficiently above the boiling point of any volatiles, typically around 300 to 800° C., to remove the volatiles and stabilize the filter. This is especially important when oxide precursors are used. An additional firing at high temperatures is then carried out, typically at 1200 to 1400° C., to form stable crystalline phases. Firing above 1450° C. may melt some of the phases and result in a fused product which is undesirable due to reduced thermo-mechanical properties. Preferably, the heating rate during the high temperature firing does not exceed 20° C. per minute, in order to allow any glass phases to crystallize, and may be as low as 0.1° C. per minute. During high temperature firing, glass fibers may devitrify into crystalline phases, the matrix may convert to stable crystalline phases or the crystalline phases in the fiber and matrix may react to form new stable crystalline phases. The final phase composition of the product depends on the amounts of fiber and matrix, the heating profile, soaking time at intermediate temperatures and the dwell time at the highest firing temperature. The typical crystalline phases are corundum, mullite, cordierite and cristobalite. As used herein, the term cordierite is intended to include indialite, a crystalline material having the same composition as cordierite, but a slightly disordered crystal structure. Excess cristobalite formation is undesirable since cristobalite undergoes a volume change at 200–270° C., which contributes to poor thermal shock resistance. The final filter should contain no more than 10% by weight cristobalite. Preferably the final composition of the filter is 3–7 parts by weight magnesia, 20–45 parts silica and 45–70 parts alumina. More preferably the final filter comprises between about 60%–70% alumina.

In a preferred embodiment, the yarn used to prepare both the support and membrane comprises glass fibers comprising 61–66% $SiO_2$, 24–26% $Al_2O_3$, and 9–10% MgO. A coating composition consisting essentially of alumina is applied to the yarn prior to winding in an amount sufficient to provide a refractory oxide matrix comprising 40–70% of the final weight of the filter. The coating composition contains a binder comprising fumed alumina particulates having an average particle size of 13–15 nm and alumina matrix particulates having an average particle size of 2–3 microns. The membrane is applied to the support or mandrel by hoop winding. The green filter element is heated to remove volatiles and then high temperature fired at temperatures above about 1350° C., preferably at a temperature of about 1380° C. During high temperature firing, the glass fiber softens and the silica and magnesia in the glass in combination with the alumina matrix material combine to form cordierite and mullite. The final filter comprises about 20–40% by weight $SiO_2$, about 3–6% by weight MgO and about 50–70% by weight $Al_2O_3$. The final crystalline composition, after heat treatment, is 25–40% cordierite, 5–15% mullite, 40–60% corundum and 0–10% cristobalite, based on the total crystalline content. Approximately 50–90 vol % of the material is crystalline with the remainder being amorphous. The formation of crystals of mullite, cordierite, and corundum, each having different coefficients of thermal expansion, leads to formation of microcracking in the structure. The microcracks form along crystalline boundaries as well as within regions having only a single crystal phase. The microcracks are believed to absorb stresses caused by thermal shock. After firing, the filter is stable up to 1200° C. for extended periods of time and has excellent thermal shock resistance.

EXAMPLES

All percentages referred to herein are weight percent, unless otherwise indicated.

The filament winder used to wind the support in the Examples below had a chain-driven traverse of approximately 70 inches (178 cm) (278 teeth of 0.5 inch (1.27 cm) pitch passing in a narrow loop driven and supported by 11 tooth drive sprockets at each end). The drive ratio was set such that the spindle rotated at a speed of 50 and 10/111 revolutions for each complete rotation of the chain loop for winding of the filter support. The mandrel was a tube having a length of 65 inches (165 cm) and an outer diameter of 1.75 inches (4.45 cm) with end closures at each end. One of the end closures was conical with about a 30 degree taper on each side of the cone with a 0.50 inch (1.27 cm) diameter drive shaft mounted at its axis. The second end closure was hemispherical (1.75 in (4.45 cm) diameter) with a 0.25 inch (0.64 cm) drive shaft mounted at its axis. The mandrel was attached to and driven by the spindle in such a position as to be traversed along its length by the traversing yarn guide. The mandrel was attached to and driven by the spindle via the 0.50 inch (1.27 cm) shaft and supported in a bearing at the 0.25 inch (0.64 cm) shaft. It was mounted parallel to the chain-driven traverse guide such that the guide traversed above the mandrel surface at a distance of about 0.75 inch (1.91 cm) from the surface of the mandrel and the traverse stroke extended from about 0.75 inch (1.91 cm) past the hemispherical closure onto the 0.25 inch (0.64 cm) shaft and to about 0.75 inch (1.91 cm) past the conical closure onto the 0.5 inch (1.27 cm) shaft.

A plastic collar having a 7 mm wall thickness and a 45 degree edge relative to the axis of the collar was inserted on the mandrel near the conical end to form the flange on the filter support for Examples 1 and 3.

For Example 2, a separate winder having a 6 inch (15.2 cm) traverse stroke with means to adjust this stroke to contour the package ends was used to form a collar insert for the flange section of the filter. The drive ratio was set such that the spindle rotated at a speed of 4 and 11/180 revolutions for each complete rotation of the traverse cam to provide the same wind angle in the collar insert as the wind angle in the support. A mandrel comprising a short piece of 1.75 inch (4.45 cm) outer diameter tube was mounted on the spindle and wrapped with 2 layers of 0.002 inch (0.005 cm) thick "Mylar" polyester film to facilitate removal of the wound unit. The mandrel was wrapped with 90 grams of S-glass (S-2 CG150 ½ 636, available from Owens-Corning Fiberglas Corporation of Toledo, Ohio) that was coated with an aqueous A-17 alumina slurry (see Example 1 for composition of slurry) applied in such a quantity to form a unit having 50–60 wt % ceramic from the slurry and 40–50 wt % ceramic derived from the feed yarn after drying. The collar insert, as wound, had the form of a cylinder of approximately 1.75 inch (4.45 cm) inner diameter and a ⅜ inch (0.95 cm) wall thickness with the ends of the cylinder wall exhibiting a taper of approximately 45°. The insert was removed from its mandrel while still wet and transferred to the mandrel on the main filament winder, described above. The insert was positioned so as to leave about 57 inches (145 cm) of the straight tube portion of the mandrel exposed between the insert edge and the juncture of the tube with the hemispherical end closure.

The filter support units were wound onto the mandrels with either the collar insert or plastic collar mounted thereon. Winding was carried out with the spindle set at a rotational speed of approximately 500–520 revolutions per minute. The final (fired) support units had diamond-shaped openings on the outer surface having dimensions of about 175–250 microns.

Test Methods

The density and porosity of the membrane layers was determined using mercury porosimetry. Membrane samples were prepared for porosimetry measurements using either of two methods. The membrane layer can be readily debonded from the support prior to firing of the candle assembly. The debonded membrane layer is then high-temperature fired and submitted for porosimetry measurements. Alternatively, the membrane sample may be prepared by scraping away the support layer from a sample of a high-temperature fired candle assembly. The median pore size is reported in microns and the porosity is reported in volume percent. The median pore size is the value obtained at the maximum intrusion volume.

The average oxide composition was determined using X-ray Fluorescence spectroscopy. The samples and standards were fused in a lithium tetraborate flux and the X-ray emission lines for the elements of interest were measured. The results are reported as weight percent with the samples being dried at 130° C.

Crystalline phase compositions were determined using X-ray diffraction using a Scintag Pad X theta-theta diffractometer using Cu K-alpha radiation. The following conditions were used: copper tube operated at 45 kilovolts, 40 milliamps, goniometer radius 250 mm, beam divergence 0.24 degree, scatter slit 0.43 degrees, receiving slit 0.2 mm, germanium solid state detector bias 1000 V, scan speed 0.2 degrees 2-theta per minute, chopper increment 0.03 degrees 2-theta, scan range 3 to 112 degrees 2-theta (overnight scans), samples front packed against filter paper in a 1 inch square aluminum well-type sample holder, single sample changer. The samples were wet milled in acetone for 5 minutes in a McCrone vibratory mill using corundum grinding elements and dried under a heat lamp. The percentages of crystalline phases were determined based on a mixture of standard materials with 20% fluorite as an internal standard. Standard materials used were NIST (NBS) 674 alpha alumina (corundum), Baikowski high purity cordierite (indialite) standard, Coors mullite standard, NIST (NBS) 1879 cristobalite, NIST (NBS) 1878 quartz, and Coors spinel standards. The samples themselves were not mixed with an internal standard but were normalized to 100% of the crystalline components after dividing each measured intensity by its respective reference intensity ratios. Analysis lines were: indialite at 10.4, 18.2 and 29.5 degrees; mullite at 16.5 and 26.1 degrees, corundum at 25.6 and 52.6 degrees, cristobalite at 21.8 degrees (overlap corrected for indialite), and quartz at 20.8 degrees.

Example 1

This example illustrates the fabrication of a ceramic filter according to the current invention, wherein the membrane layer is applied to the outer surface of the support and is formed using a woven glass fabric.

An alumina slurry was prepared by charging 7.0 liters of water and 20.0 ml of formic acid in a mixing vessel. Fumed alumina having an average particle size of 13–15 nm (manufactured and sold by Degussa) (2.0 kg) was added slowly with stirring. The pH of the dispersion was adjusted to 4.0 to 4.1 using formic acid. After stabilizing at this pH for two hours, 11.0 kg of A-17 alumina (average particle size 2–3 microns, manufactured and sold by Alcoa) was added in portions and stirred overnight. Glycerol was added to the slurry at a level of 3 wt % based on the total weight of the slurry. The solids content of the dispersion was 62–65 weight percent and the viscosity was adjusted to 140 centipoise by water addition, measured with a Brookfield viscometer (Model No. RV1) using the #1 spindle.

A 2-ply glass yarn (150 filaments/ply) comprising 65.2% $SiO_2$, 23.8% $Al_2O_3$, and 10.0% MgO having a hydrophilic sizing to aid wetting by the aqueous coating composition (S glass, designation S-2 CG150 1/2 636, available from Owens-Corning Fiberglass Corporation) was fed through a ball tensioner, passed through the alumina slurry, and pulled out through a 0.017 in (0.043 cm) die to remove excess slurry. The die controlled the amount of slurry applied to the yarn so that, after drying, about 50–60% by weight of ceramic in the support was from the slurry and about 40–50% by weight was derived from the yarn. The wet yarn was then passed through a guide attached to the traverse arm of the filament winding machine and wound onto the contoured mandrel described above wrapped with 2 layers of 0.002 in (0.005 cm) "Mylar" polyester film. The winding was stopped after about 1000 grams of yarn were wound onto the mandrel, when the support reached the desired outside diameter (approximately 60 mm). After drying overnight at room temperature, the filament-wound tube was removed from the mandrel by cutting through the wound material at about the center of the raised flange section (indicating the location of the plastic collar insert) and removing the two pieces from the opposite ends of the mandrel.

The outer membrane layer was attached to the support as follows. S-2 glass fabric (plain weave, 1.5 oz/square yard) available from Burlington Glass Fabric (Altavista, Va.) was cut into pieces of length and width approximately equal to the length and circumference of the tube respectively. Each piece was wrapped on the body of the tube and an alumina slurry containing A-16 alumina (manufactured and sold by Alcoa, average particle size 0.45 micron) with 55 to 60 weight percent solid content, 3 wt % glycerol, and 100 to 120 cps viscosity, was brushed on the fabric. The fabric was not applied to the flange and the bottom end of the tube. Any wrinkles in the fabric were removed by rubbing with a wet sponge while the fabric was still wet before adding additional layers of fabric. Two additional layers of fabric were attached in a similar manner such that the closing of the ends in each layer of fabric fell approximately 120 degree apart in the final filter. After all fabric layers were applied, the tube was dried overnight at room temperature. It was then low-temperature fired at 700° C. for one hour in a muffle furnace to remove volatiles and stabilize the structure.

The flange section was reinforced and sealed by dipping one time in an alumina slurry (fumed alumina/A-17 alumina, described above) and draining off the excess. A wad of S-2 glass fibers was inserted into the hole in the bottom end of the filter and the bottom end was then dipped in the A-17 alumina slurry. After thorough drying and firing at 700° C. for one hour, the filter was fired in a high temperature furnace. The temperature was increased to 800° C. in about 40 minutes, held for about 20 minutes, then increased to 1300° C. at a rate of 2° C./minute, held for 2 hours, then heated at a rate of 1° C./minute to 1380° C., held for two hours and cooled to 800° C. at a rate of 5° C./minute, followed by unrestrained cooling of the furnace to 200° C. The filter was then removed from the furnace and allowed to cool to room temperature in air.

The membrane layer had a bulk density of 1.62 g/cc and a volume porosity of 39% with a median pore diameter of 0.45 ram, measured by mercury porosimetry. The average oxide composition of the filter, determined by X-ray fluorescence, was 27% silica, 68% alumina and 4% magnesia. The crystalline phase composition, determined by X-ray diffraction, was 35% cordierite (indialite), 6% mullite, 50% corundum and 9% cristobalite.

Example 2

This example illustrates the fabrication of a ceramic filter of the current invention, wherein the outer membrane layer is formed by circular winding.

A filter support was prepared in a manner similar to that described in Example 1 except that the filament-wound collar insert was used to form the flange section instead of the plastic collar. When the support element was cut through for removal from the mandrel, the wound collar was cut through as well such that a section of the original collar remained in the flange section of the support. The mandrel with the support wound thereon was immediately transferred to a specialized winder for formation of the membrane layer.

The outer membrane was applied to the support by circular (hoop) winding of a glass yarn (S-2 CG 150 1/2 636, available from Owens-Corning Fiberglas Corporation) on the surface of the support. The filament winder used for formation of the membrane layer had a screw driven traverse, with the drive ratio set such that the spindle rotated at a speed of 75 complete revolutions for each 1 inch (2.54 cm) travel of the traverse guide so that the yarn was placed at a spacing of 75 yarns per linear inch of tube surface. Adjacent yarn windings were as close to each other as possible without overlapping. The yarn was soaked in the A-17/fumed alumina slurry, and pulled through a 0.017 in (0.043 cm) die prior to winding. About 60 grams of yarn were wound on the support surface to form a single layer of winding over its length. The circular winding was done across the entire length of the filter, bottom end and flange section. After overnight drying (12–16 hours) at ambient temperature, the tube was removed from the mandrel as described in Example 1. After inspection for defects, the filter unit was fired at 700 degrees C. for two hours. Then the bottom hole was then filled with a wad of S-glass yarn. The flange and bottom sections of the tube were dipped in the A-17/fumed alumina slurry, the excess drained off, and dried thoroughly. The combined support and membrane was then high-temperature fired as described in Example 1.

The membrane layer had a bulk density of 1.61 g/cc and a volume porosity of 39% with a median pore diameter of 0.43 μm, as measured by mercury porosimetry. The average oxide composition of the filter, determined by X-ray fluorescence, was 27% silica, 68% alumina and 4% magnesia. The crystalline phase composition, determined by X-ray diffraction, was 33% cordierite, 8% mullite, 49% corundum and 10% cristobalite.

Example 3

This example illustrates the fabrication of a ceramic filter of the current invention, wherein the outer membrane layer is formed by multiple yarn winding. A filter support element was prepared as described in Example 1.

The outer membrane layer was formed using the same filament winder as was used to form the support. Yarns from three different bobbins of S-2 CG 150 1/2 636 glass yarn were combined and fed through a tension device, dipped in the A-17/fumed alumina slurry described in Example 1, pulled through a 0.025 in (0.64 mm) diameter sizing orifice, and wound on the support. The same wind angle, mandrel rotation rate, and traverse arm speed used for the support was used for winding the membrane layer. The winding was continued until two layers of yarn had been wound onto the mandrel so that the yarn covered the entire surface of the support. After drying overnight, the bottom end and flange sections were treated as described in Example 2. The assembly was then high temperature fired as described in Example 1.

The membrane layer had a bulk density of 1.75 g/cc and a volume porosity of 37% with a median pore diameter of 0.64 μm, as measured by mercury porosimetry. The average oxide composition, determined by X-ray fluorescence, was 27% silica, 68% alumina and 4% magnesia. The crystalline phase composition, determined by X-ray diffraction, was 35% cordierite, 6% mullite, 50% corundum and 9% cristobalite.

Example 4

This example illustrates the fabrication of a ceramic filter of the current invention, wherein membrane layers are applied to both the inner and outer surfaces of the support and are formed by circular winding.

The inner membrane was formed by the circular winding of glass yarn, saturated with a ceramic particulate slurry, around a plactic-wrapped mandrel. After preparing a mandrel (as described in Example 1), a filament-wound collar insert (as described in Example 2) was positioned so as to leave about 57 inches (145 cm) of the straight tube portion of the mandrel exposed between the insert edge and the juncture of the tube with the hemispherical end closure. The mandrel was then placed on the same circular (hoop) winder used in Example 2, but with the spindle set to rotate at a speed of about 71.6 complete revolutions for each 1 inch (2.54 cm) travel of the traverse guide so that the yarn was placed at a spacing of about 71.6 yarns per linear inch of tube surface. The "S-2CG150 1/2 636" glass yarn (available from Owens-Corning Fiberglas Corporation) was soaked in the A-17/fumed alumina slurry, and pulled through a 0.015 in (0.038 cm) die prior to winding. Using approximately 60 grams of yarn, the mandrel was wrapped from the juncture of the tube with the hemispherical end closure to the edge of the filament-wound collar insert.

While the yarn was still wet, a filter support was laid down, essentially as described in Example 1, using the chain-driven filament winder. The support was wound over the hemispherical end, the inner membrane and the filament-wound collar insert.

When the support was complete it was put back on the circular (hoop) winder and the flange and tip ends of the unit were reinforced as follows by the infiltration of alumina slurry. While the mandrel was rotated at 100 RPM, approximately 20 cc of the A-17/fumed alumina slurry described in Example 1 was gradually introduced to about 2 inches of the tip of the unit. An additional 20 cc of slurry was similarly applied to the flange region, from the shoulder of the flange to 1.5 inches below the collar insert.

When the slurry had been absorbed into the tip and flange by capillary action, and there was no excess slurry on the surface, the outer membrane was hoop wound onto the support layer, essentially as described in Example 2. During each of the winding procedures, a humidity level of at least 30% was maintained.

Heat guns were set up to dry the infiltrated regions, while maintaining rotation, for at least 20 minutes. Afterward, the mandrel was removed from the winder and placed in a vertical support rack.

After overnight drying (about 12–16 hours) at ambient temperature, the tube comprising an inner membrane, a support layer and an outer membrane, was removed from the mandrel as described in Example 1.

After inspection for defects, the open hole in the tip of the unit was filled with a paste comprising by weight about 68% of the A-17/fumed alumina slurry described in Example 1, about 3% short staple S-glass yarn, and about 29% partially-fired alumina-coated S-glass particulate.

The filter was fired to a peak temperature of 1380° C. following the cycle described in Example 1.

What is claimed is:

1. A ceramic hot gas filter comprising:

a porous elongated filter support, said support having an outer surface, an opening at one end into a hollow interior, a closed end opposite said open end, and an external flange integral with said open end, said support being formed of a plurality of layers of oxide ceramic yarn, each layer being arranged in a criss-crossing relationship with neighboring layers to form a plurality of quadrilateral-shaped openings, said yarn being coated with a first oxide ceramic material, said first oxide ceramic material providing, upon heat treatment, a porous refractory oxide support matrix; and a porous membrane layer on the inner surface of said support, said membrane layer having a porosity less than that of said support wherein the pore diameters are about 0.1 to 10 microns in said membrane layer and comprising an ordered arrangement of continuous filament oxide ceramic yarn coated with a second oxide ceramic material, said second oxide ceramic material providing, upon heat treatment, a porous refractory oxide membrane matrix.

2. The filter of claim 1, further comprising a porous membrane layer on the outer surface of said support, said membrane layer having a porosity less than that of said support wherein the pore diameters are about 0.1 to 10 microns in said membrane layer and comprising an ordered arrangement of continuous filament oxide ceramic yarn coated with a third oxide ceramic material, said third oxide ceramic material providing, upon heat treatment, a porous refractory oxide membrane matrix.

3. The filter of claim 2 wherein said first oxide ceramic material comprises a first oxide ceramic particulate and wherein said second oxide ceramic material comprises a second oxide ceramic particulate and wherein said third oxide ceramic material comprises a third oxide ceramic particulate.

4. The filter of claim 2 wherein said first oxide ceramic material further comprises a first oxide ceramic precursor and wherein said second oxide ceramic material further comprises a second oxide ceramic precursor and wherein said third oxide ceramic material comprises a third oxide ceramic precursor.

5. The filter of claim 2 wherein said support yarn and said continuous filament membrane yarn each comprise at least 20 weight percent alumina and have a softening point above about 750° C.

6. The filter of claim 5 wherein said quadrilateral-shaped openings have dimensions of about 100 to about 500 microns after heat treatment.

7. The filter of claim 1 wherein said membrane layer has pore diameters of about 0.1 to about 5 microns.

8. The filter of claim 1 wherein said support yarn has generally the same composition as said continuous filament membrane yarns and wherein said support matrix has generally the same composition as said membrane matrices.

9. The filter of claim 1 wherein between about 40 to about 70 percent of the total weight of said filter is from the combined weight of said support matrix and said membrane matrices.

10. The filter of claim 1 wherein between about 50 to 60 percent of the total weight of said filter is from the combined weight of said support matrix and said membrane matrices.

11. The filter of claim 1 wherein said support yarn and said membrane yarn each comprise between about 61–66 wt % $SiO_2$, 24–26 wt % $Al_2O_3$ and 9–10 wt % MgO.

12. The filter of claim 13 wherein said first, second and third oxide ceramic particulates each comprise $Al_2O_3$.

13. The filter of claim 12 wherein said filter has a crystalline composition of about 25–40% cordierite, 5–15% mullite, 40–60% corundum, and 0–10% cristobalite, based on the total crystalline content of the filter.

14. The filter of claim 2 wherein said membrane layer has pore diameters of about 0.1 to about 5 microns.

15. The filter of claim 1 wherein said first oxide ceramic material comprises a first oxide ceramic particulate and said second oxide ceramic material comprises a second oxide ceramic particulate.

16. The filter of claim 15 wherein said first and second oxide ceramic particulates each comprise $Al_2O_3$.

17. The filter of claim 1 wherein said support yarn and said continuous filament membrane yarn each comprise at least 20 weight percent alumina and have a softening point above about 750° C.

18. The filter of claim 17 wherein said quadrilateral-shaped openings have dimensions of about 100 to about 500 microns after heat treatment.

19. The filter of claim 2 wherein said support yarn has generally the same composition as said continuous filament membrane yarns and wherein said support matrix has generally the same composition as said membrane matrices.

20. The filter of claim 2 wherein between about 40 to about 70 percent of the total weight of said filter is from the combined weight of said support matrix and said membrane matrices.

21. The filter of claim 2 wherein between about 50 to about 60 percent of the total weight of said filter is from the combined weight of said support matrix and said membrane matrices.

22. The filter of claim 2 wherein said support yarn and said membrane yarn each comprise between about 61–66 wt % $SiO_2$, 24–26 wt % $Al_2O_3$ and 9–10 wt % MgO.

23. The filter of claim 16 wherein said filter has a crystalline composition of about 25–40% cordierite, 5–15% mullite, 40–60% corundum, and 0–10% cristobalite, based on the total crystalline content of the filter.

* * * * *